United States Patent
Ahmed et al.

(10) Patent No.: US 11,844,144 B2
(45) Date of Patent: Dec. 12, 2023

(54) CUSTOMIZED PIN/PUK REMOTE PROVISIONING

(71) Applicant: Telefonaktiebolaget LM Ericsson (publ), Stockholm (SE)

(72) Inventors: Abu Shohel Ahmed, Espoo (FI); Patrik Salmela, Espoo (FI); Kazi Wali Ullah, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/759,285

(22) PCT Filed: Oct. 27, 2017

(86) PCT No.: PCT/EP2017/077577
§ 371 (c)(1),
(2) Date: Apr. 24, 2020

(87) PCT Pub. No.: WO2019/081038
PCT Pub. Date: May 2, 2019

(65) Prior Publication Data
US 2020/0280839 A1    Sep. 3, 2020

(51) Int. Cl.
*H04W 4/60* (2018.01)
*H04W 8/20* (2009.01)
(Continued)

(52) U.S. Cl.
CPC .............. *H04W 8/205* (2013.01); *H04W 4/60* (2018.02); *H04W 8/186* (2013.01); *H04W 12/35* (2021.01); *H04W 12/72* (2021.01)

(58) Field of Classification Search
CPC ....... H04W 24/08; H04W 4/02; H04W 4/029; H04W 4/021; H04W 4/70; H04W 84/042; H04W 8/14; H04W 8/22; H04W 8/245; H04W 8/18; H04W 8/205; H04W 12/06; H04W 12/35; H04W 12/08; H04W 8/20; H04W 12/0431; H04W 12/082;
(Continued)

(56) References Cited

U.S. PATENT DOCUMENTS 9,706,407 B2 * 7/2017 Seo .................. H04W 8/20
9,961,160 B2 * 5/2018 Park .................. H04L 9/08
(Continued)

OTHER PUBLICATIONS

GSM Association Document SGP.22—RSP Technical Specification Version 2.20 Yolanda Sanz Sep. 1, 2017, 64-191.*
(Continued)

*Primary Examiner* — Joseph Arevalo
(74) *Attorney, Agent, or Firm* — Rothwell, Figg, Ernst & Manbeck, P.C.

(57) ABSTRACT

There is provided mechanisms for handling a subscription profile for a subscriber entity. A method is performed by a subscription management entity. The method comprises obtaining a request from a mobile network operator entity to configure the subscription profile for the subscriber entity. The method comprises configuring the subscription profile with a customized PIN/PUK code for the subscriber entity. The method comprises providing an indication of the customized PIN/PUK code being configured in the subscription profile in a response to the mobile network operator entity.

19 Claims, 5 Drawing Sheets

(51) Int. Cl.
*H04W 8/18* (2009.01)
*H04W 12/30* (2021.01)
*H04W 12/72* (2021.01)

(58) Field of Classification Search
CPC ....... H04W 4/60; H04W 88/02; H04W 12/04; H04W 4/50; H04W 12/10; H04W 12/77; H04W 84/04; H04W 8/183; H04W 12/40; H04W 12/72; H04W 12/068; H04W 12/63; H04W 4/80; H04W 76/14; H04W 8/186
USPC ............ 455/411, 413, 450, 435.1, 558, 405, 455/422.1, 406, 552.1, 419, 466; 370/328, 329
See application file for complete search history.

(56) References Cited

U.S. PATENT DOCUMENTS

| | | | | |
|---|---|---|---|---|
| 10,069,970 B1* | 9/2018 | Drake | ..................... | H04M 3/02 |
| 10,743,181 B1* | 8/2020 | Selvaraj | ................ | H04W 12/06 |
| 2004/0103325 A1* | 5/2004 | Priebatsch | ............ | H04L 9/3271 |
| | | | | 726/6 |
| 2010/0274853 A1* | 10/2010 | Carlson | ................ | G06Q 20/202 |
| | | | | 709/204 |
| 2011/0022522 A1* | 1/2011 | Sege | .................... | G06Q 20/389 |
| | | | | 705/75 |
| 2011/0081860 A1* | 4/2011 | Brown | ................... | H04N 1/327 |
| | | | | 455/41.3 |
| 2011/0137791 A1* | 6/2011 | Zabawskyj | ............ | G06Q 40/00 |
| | | | | 705/39 |
| 2011/0165896 A1* | 7/2011 | Stromberg | ......... | G06Q 20/3226 |
| | | | | 455/466 |
| 2011/0217994 A1* | 9/2011 | Hirson | .................. | H04M 15/00 |
| | | | | 455/466 |
| 2012/0190354 A1* | 7/2012 | Merrien | .................... | G06F 8/61 |
| | | | | 455/422.1 |
| 2013/0133086 A1* | 5/2013 | Liberman | ................ | G09C 5/00 |
| | | | | 726/28 |
| 2014/0068722 A1* | 3/2014 | Hayat | ................. | H04W 12/084 |
| | | | | 726/4 |
| 2016/0057725 A1* | 2/2016 | Suh | ........................ | G06Q 50/30 |
| | | | | 455/435.1 |
| 2016/0373920 A1 | 12/2016 | Petersson et al. | | |
| 2017/0161721 A1 | 6/2017 | Han et al. | | |
| 2017/0180567 A1* | 6/2017 | Sharma | .................... | H04W 4/14 |
| 2018/0027486 A1* | 1/2018 | Corradino | ............. | H04W 48/17 |
| | | | | 370/254 |
| 2018/0270363 A1* | 9/2018 | Guday | ............. | H04M 15/8214 |
| 2019/0068608 A1* | 2/2019 | Boland | ................. | G06F 16/252 |
| 2019/0318377 A1* | 10/2019 | Sundaram | ........... | G06Q 20/389 |
| 2020/0404501 A1* | 12/2020 | Kang | .................... | H04W 8/205 |

OTHER PUBLICATIONS

International Search Report and Written Opinion dated Jan. 15, 2018 issued in International Patent Application No. PCT/EP2017/077577. (13 pages).

ETSI TS 103 383 V12.8.0 (Oct. 2015); Smart Cards; Embedded UICC; Requirements Specification; (Release 12); Oct. 2015. (29 pages).

Deutsche Telekom, "eUICC User PIN", ETSI TC SCP REQ Meeting #46; Tdoc SCP(14)000023; Change Request, Sophia-Antipolis, France, Feb. 10-12, 2014. (2 pages).

GSM Association; RSP Technical Specification; Version 2.2; Sep. 1, 2017. (264 pages).

GSM Association; RSP Technical Specification; Version 2.1; Feb. 27, 2017. (247 pages).

* cited by examiner

CUSTOMIZED PIN/PUK REMOTE PROVISIONING

CROSS REFERENCE TO RELATED APPLICATION(S)

This application is a 35 U.S.C. § 371 National Stage of International Patent Application No. PCT/EP2017/077577, filed Oct. 27, 2017, designating the United States.

TECHNICAL FIELD

Embodiments presented herein relate to a method, a subscription management entity, a computer program, and a computer program product for handling a subscription profile for a subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card.

The GSM Association (GSMA), where GSM is short for Global System for Mobile communications, has released a technical specification denoted SGP.22-RSP V2.1, below denoted SGP.22v2.1, defining remote SIM provisioning for consumer devices and a technical specification denoted SGP.02 disclosing a remote provisioning architecture for embedded UICC (eUICC), which targets machine-to-machine (M2M) type communications devices.

In remote SIM provisioning, the operator uses an entity called SM-DP+/SM-DP (where SM-DP is short for Subscription Management-Data Preparation) for creation of SIM profiles, such as universal (U)SIM profiles, that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 30.1 in SGP.22v2.1 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

The usage of a particular SIM profile is protected in the eUICC by the Personal Identification Number (PIN) code and the Personal Unlocking Key (PUK) code. The notation PIN/PUK code will hereinafter be used to denote PIN code and/or PUK code as fit in the context where the term PIN/PUK code is used, whereas the explicit notation PIN code will be used to denote PIN code only, and the explicit notation PUK code will be used to denote PUK code only. The PIN/PUK code acts as a defence mechanism for improper usage of the SIM profile. When a device is switched on, or the SIM profile is otherwise enabled (e.g. after flight mode), the PIN code (typically consisting of 4 to 8 digits) might need to be entered by the user, if this functionality has not been disabled by the user. Commonly, if a wrong PIN code is entered three times, then the PIN code and the device, or SIM profile, is locked. The PIN code value and the number of maximum attempts to try are controlled by the 'pinValue' and 'maxNumberOfAttempts' SIM profile elements, respectively. If more than 'maxNumberOfAttempts' unsuccessful attempts are made for the PIN code, the SIM profile is locked. If the SIM profile is locked, or the user forgets the PIN code, the PUK code can be entered to unlock the SIM profile. The PUK code is also stored in the SIM profile. However, if 'maxNumberOfAttempts' of the wrong PUK code is entered, the SIM profile is permanently locked. This makes the SIM profile unusable. Due to this, some mobile network operators save the PUK code of the SIM profiles in their customer database (or provide the option to do so).

Commonly, subscriber and SIM profile shared data (such as PIN/PUK code) are pre-populated by the SIM card manufacturer during the manufacturing process or defined earlier. Later on, when the SIM profile is provided to the user, this information is handed over to the user.

However, although this is a robust way of handling the PIN/PUK code, it does not allow for alternative ways of provisioning the SIM profile, including provisioning of the PIN/PUK code. Hence, there is a need for an improved handling of subscription profiles, such as SIM profiles, for subscriber entities.

SUMMARY

An object of embodiments herein is to provide efficient handling of subscription profiles, such as SIM profiles, for subscriber entities.

According to a first aspect there is presented a method for handling a subscription profile for a subscriber entity. The method is performed by a subscription management entity. The method comprises obtaining a request from a mobile network operator entity to configure the subscription profile for the subscriber entity. The method comprises configuring the subscription profile with a customized PIN/PUK code for the subscriber entity. The method comprises providing an indication of the customized PIN/PUK code being configured in the subscription profile in a response to the mobile network operator entity.

According to a second aspect there is presented a subscription management entity for handling a subscription profile for a subscriber entity. The subscription management entity comprises processing circuitry. The processing circuitry is configured to cause the subscription management entity to obtain a request from a mobile network operator entity to configure the subscription profile for the subscriber entity. The processing circuitry is configured to cause the subscription management entity to configure the subscription profile with a customized PIN/PUK code for the subscriber entity. The processing circuitry is configured to cause the subscription management entity to provide an indication of the customized PIN/PUK code being configured in the subscription profile in a response to the mobile network operator entity.

According to a third aspect there is presented a subscription management entity for handling a subscription profile for a subscriber entity. The subscription management entity comprises processing circuitry and a storage medium. The storage medium stores instructions that, when executed by the processing circuitry, cause the subscription management entity to perform operations or steps. The operations, or steps, cause the subscription management entity to obtain a request from a mobile network operator entity to configure the subscription profile for the subscriber entity. The operations, or steps, cause the subscription management entity to configure the subscription profile with a customized PIN/PUK code for the subscriber entity. The operations, or steps, cause the subscription management entity to provide an indication of the customized PIN/PUK code being configured in the subscription profile in a response to the mobile network operator entity 300.

According to a fourth aspect there is presented a subscription management entity for handling a subscription profile for a subscriber entity. The subscription management entity comprises an obtain module configured to obtain a request from a mobile network operator entity to configure the subscription profile for the subscriber entity. The subscription management entity comprises a configure module configured to configure the subscription profile with a customized PIN/PUK code for the subscriber entity. The subscription management entity comprises a provide module configured to provide an indication of the customized PIN/PUK code being configured in the subscription profile in a response to the mobile network operator entity.

According to a fifth aspect there is presented a computer program for handling a subscription profile for a subscriber entity, the computer program comprising computer program code which, when run on a subscription management entity, causes the subscription management entity to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these subscription management entities, this computer program and this computer program enable efficient handling of subscription profiles for subscriber entities.

Advantageously this method, these subscription management entities, this computer program and this computer program enable flexibility in terms of configuring subscriber related data (e.g., PIN/PUK code) for the subscriber entity.

Advantageously this method, these subscription management entities, this computer program and this computer program enable security as well as flexibility in terms of distributing the PIN/PUK code to the subscriber entity.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
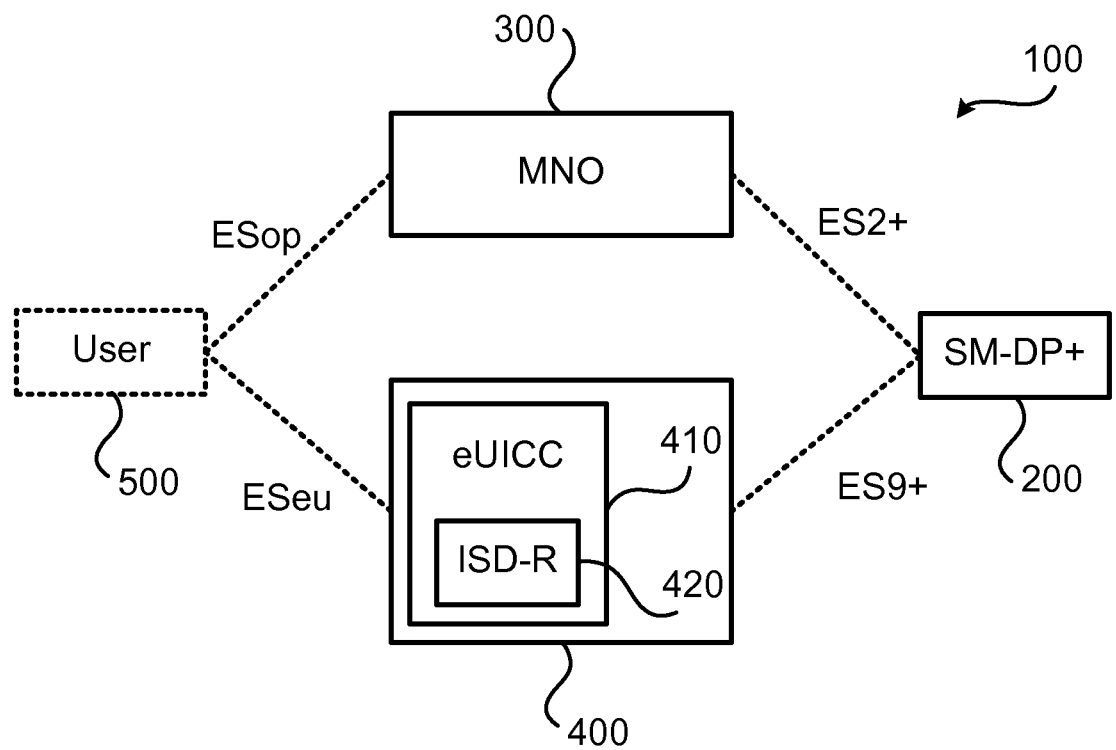
FIG. 1 is a schematic diagram illustrating a communication system according to embodiments.

FIG. 1 is a schematic diagram illustrating a communications system 100 where embodiments presented herein can be applied. The communications system 100 comprises a subscription management entity 200, a communications network represented by a mobile network operator (MNO) entity 300, and a subscriber entity 400. The subscriber entity 400 might be part of a terminal device, being either a consumer device (such as a mobile phone, modem, vessel, vehicle, or drone), or a machine-type communications (MTC) device (such as a sensor, or an Internet of Things device, etc.)

FIG. 1 further illustrates a user 500 which might interact with the subscriber entity 400 over an eSIM end user (ESeu) interface and with the mobile network operator entity 300 over an eSIM operator (ESop) interface.

The subscription management entity 200 is configured to interact with the mobile network operator entity 300 (for example via interface ES2+) and the subscriber entity 400 (for example via interface ES9+). The subscription management entity 200 might be an enhanced Subscription Manager Data Preparation (SM-DP+) entity.

The subscriber entity 400 comprises a profile handling unit, which could be provided as an Issuer Security Domain Root (ISD-R) function 420, or just ISD-R for short, and a remote subscription handling and storing unit, such as an Embedded Universal Integrated Circuit Card (eUICC) 410. According to some aspects the ISD-R 420 is provided within the eUICC 410. Functions of an embedded SIM (eSIM, e-SIM, or virtual SIM) circuit could be part of the function of the eUICC 410. The subscriber entity 400 is, via its hosting terminal device, capable of communicating with the mobile network operator entity 300, and thereby access services and exchange data with the communications network.

As disclosed above, current mechanisms allow for robust but non-flexible ways of provisioning SIM profiles, including provisioning of the PIN/PUK code.

In more detail, pre-provisioning of customer data (such as PIN/PUK code) in the subscription management entity 200 and disclosing the customer data to the user 500 is not defined in the aforementioned remote SIM provisioning process specified in SGP.22v2.1. Any pre-provisioned process, if used, reduces dynamicity and might in many cases reduce security, such as pre-provisioning a default value, such as '0000' or '1234', or similar, of the PIN code, that is in some cases never changed by the user 500.

Further, if the PIN/PUK code always is defined by the mobile network operator entity 300 or the subscription management entity 200 and pre-provisioned to the subscription profile, this results in lack of flexibility and/or usability from the perspective of the user 500. For example, the user 500 might be prevented from selecting/configuring a customized PIN/PUK code.

Further, it might be that the device hosting the subscriber entity 400 does not have access to a user interface by means of which a user 500 could enter the PIN/PUK code. This is an issue as the PIN needs to be entered every time the profile is activated. For these types of scenarios, it typically is possible to configure the PIN code to the device software such that the subscription profile is automatically unlocked. However, this configuration might be cumbersome to perform on a constrained device (such as a device lacking user interface), and becomes an issue if a large amount (such as tens or hundreds or more) of devices are to be deployed.

The embodiments disclosed herein therefore relate to mechanisms for handling a subscription profile for a subscriber entity 400. In order to obtain such mechanisms there is provided a subscription management entity 200, a method performed by the subscription management entity 200, a computer program product comprising code, for example in the form of a computer program, that when run on a subscription management entity 200, causes the subscription management entity 200 to perform the method.

Figure 2:
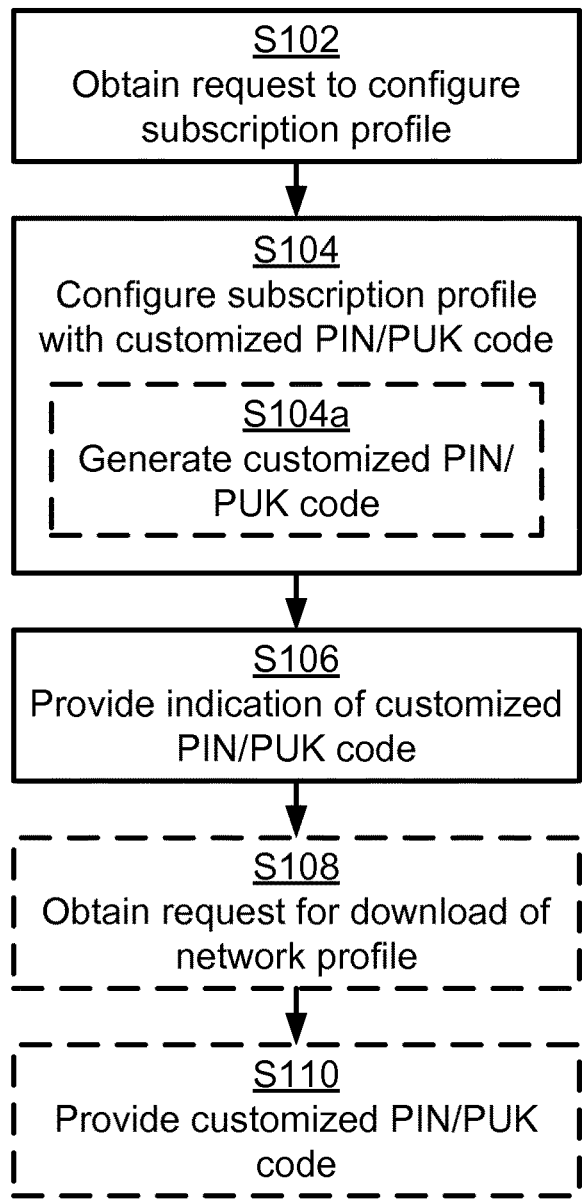
FIG. 2 is a flowchart of methods according to embodiments.

FIG. 2 is a flowchart illustrating embodiments of methods for handling a subscription profile for a subscriber entity 400. The methods are performed by the subscription management entity 200. The methods are advantageously provided as computer programs 720.

It is assumed that the subscription profile for the subscriber entity 400 is to be configured by the subscription management entity 200 and that the subscription management entity 200 thus obtains a request to do so.

Particularly, the subscription management entity 200 is configured to perform step S102:

S102: The subscription management entity 200 obtains a request from a mobile network operator entity 300 to configure the subscription profile for the subscriber entity 400. Examples of such a request will be provided below.

The subscription profile is then configured in the subscription management entity 200. Thus the subscription management entity 200 is configured to perform step S104:

S104: The subscription management entity 200 configures the subscription profile with a customized PIN/PUK code for the subscriber entity 400. Examples of entities that might generate the customized PIN/PUK code will be provided below. Examples of how the customized PIN/PUK code might be provided to the subscriber entity 400 will be provided below.

The mobile network operator entity 300 is notified once the subscription profile has been configured. Particularly, the subscription management entity 200 is configured to perform step S106:

S106: The subscription management entity 200 provides an indication of the customized PIN/PUK code being configured in the subscription profile in a response to the mobile network operator entity 300. Examples of such a response will be provided below.

This method enables efficient handling of the subscription profile for the subscriber entity 400.

This method enables dynamic configuration and distribution of the customized PIN/PUK code for the subscriber entity 400 during a remote provisioning process of the subscriber entity 400. Particularly, this method enables flexibility in terms of configuring subscriber related data (e.g., the customized PIN/PUK code) for the subscriber entity 400. Particularly, this method enables security as well as flexibility in terms of distributing the customized PIN/PUK code to the subscriber entity 400.

Embodiments relating to further details of handling a subscription profile for a subscriber entity 400 as performed by the subscription management entity 200 will now be disclosed.

There could be different examples of customized PIN codes and customized PUK codes. Typical examples of default, generic, thus non-customized, PIN codes are "0000" and "1234". Therefore, according to an embodiment the customized PIN code is different from "0000" and "1234".

There could be different types of subscription management entities 200. According to an embodiment the subscription management entity 200 is an SM-DP+ entity.

There could be different types of messages in which the request is received in step S102. In some aspects the request is received in a so-called ES2+ extension message. Particularly, according to an embodiment the request is received in an ES2+.DownloadOrder API call message.

There could be different types of messages in which the response is provided in step S106. In some aspects the response is provided in a so-called ES2+ extension message. Particularly, according to an embodiment the response is provided in an ES2+.DownloadOrder response message.

In some aspects the request obtained in step S102 indicates that the subscription profile should have a customized PIN/PUK code. Thus, according to an embodiment the request comprises an indication that the subscription profile is to be configured with the customized PIN/PUK code.

There could be different alternatives as to what entity generates the customized PIN/PUK code. Different embodiments relating thereto will now be described in turn.

In some aspects the customized PIN/PUK code is generated by the user 500 and/or the mobile network operator entity 300. In this case the customized PIN/PUK code might be included in the request received by the subscription management entity 200 in step S102. Hence, according to an embodiment the customized PIN/PUK code is included in the request.

The indication in the request might then be the customized PIN/PUK code itself. That is, according to an embodiment the indication in the request is the customized PIN/PUK code itself.

In other aspects the indication in the request is defined by absence of the customized PIN/PUK code. Thus, according to an embodiment the indication in the request is defined by absence of the customized PIN/PUK code from the request.

Thus, in some aspects the customized PIN/PUK code is not included in the request received by the subscription management entity 200 in step S102 or otherwise not provided to the subscription management entity 200. In some aspects the customized PIN/PUK code is therefore generated by the subscription management entity 200. Particularly, according to an embodiment the subscription management entity 200 is configured to perform (optional) step S104a:

S104a: The subscription management entity 200 generates the customized PIN/PUK code in conjunction with configuring the subscription profile.

In some aspects step S104a is performed as part of configuring the subscription profile in step S104.

In case the customized PIN/PUK code is not included in the request received by the subscription management entity 200 in step S102, for example in case the customized PIN/PUK code is generated by the subscription management entity 200 as in step S104a, the customized PIN/PUK code might be provided in the response to the mobile network operator entity 300 in step S106. Particularly, according to an embodiment the indication in the response is the customized PIN/PUK code itself.

There could be different ways to distribute the customized PIN/PUK code to the user 500. Different embodiments relating thereto will now be described in turn.

Information of how to distribute the customized PIN/PUK code to the user 500 might be included in the request received by the subscription management entity 200 in step S102. Particularly, according to an embodiment the request comprises an indication of how to distribute the customized PIN/PUK code to the subscriber entity 400.

In some aspects the customized PIN/PUK code is distributed to the user 500 by the mobile network operator entity 300. Information that the customized PIN/PUK code is distributed to the user 500 by the mobile network operator entity 300 might be provided to the subscription management entity 200 either implicitly or explicitly. According to an embodiment the indication in the request is defined by absence of indication that the customized PIN/PUK code is to be distributed to the subscriber entity 400 from the subscription management entity 200. This could be the case where the mobile network operator entity 300 does not explicitly instruct or inform the subscription management entity 200 to distribute the customized PIN/PUK code to the user 500 and where the subscription management entity 200 therefore does not distribute the customized PIN/PUK code to the user 500. According to an embodiment the indication in the request defines the customized PIN/PUK code to be distributed to the subscriber entity 400 not from the subscription management entity 200. The former embodiment is an example of where information is implicitly provided to the subscription management entity 200 whereas the latter embodiment is an example of where information is explicitly provided to the subscription management entity 200.

In other aspects the customized PIN/PUK code is distributed to the user 500 by the subscription management entity 200. That is, according to an embodiment the indication defines the customized PIN/PUK code to be distributed to the subscriber entity 400 from the subscription management entity 200 during download of the subscription profile.

There could be different ways for the subscription management entity 200 to act once it has provided the response to the mobile network operator entity 300 in step S106.

In some aspects the subscriber entity 400 requests download of the subscription profile. Therefore, according to an embodiment the subscription management entity 200 is configured to perform (optional) steps S108 and S110:

S108: The subscription management entity 200 obtains a request for download of the subscription profile from the subscriber entity 400.

S110: The subscription management entity 200 provides the customized PIN/PUK code to the subscriber entity 400 during the download of the subscription profile to the subscriber entity 400.

According to an embodiment the customized PIN/PUK code is provided to the subscriber entity 400 as profile metadata during the profile download.

There could be different ways to provide the customized PIN/PUK code to the subscriber entity 400 during the download of the subscription profile to the subscriber entity 400. In some aspects the customized PIN/PUK code is provided towards the user 500 in a so-called ES9+ message. Particularly, according to an embodiment the customized PIN/PUK code is provided to the subscriber entity 400 (for example as metadata) in an ES9+.AuthenticateClient Response message.

Figure 3:
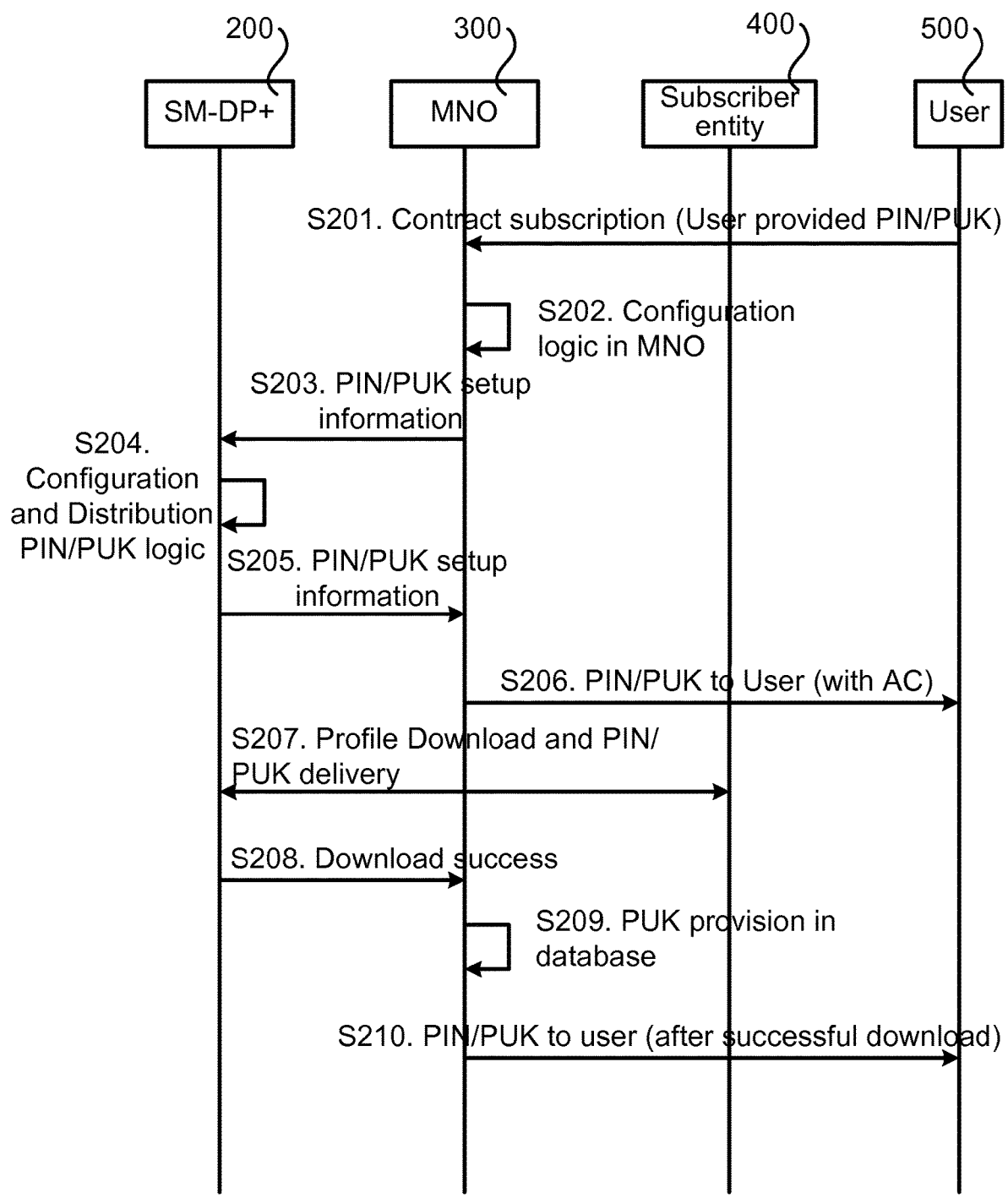
FIGS. 3 and 4 are signalling diagrams according to embodiments.

FIG. 3 is a signalling diagram illustrating particular embodiments of handling a subscription profile for a subscriber entity 400 based on at least some of the above disclosed embodiments and aspects.

According to the embodiment of FIG. 3, handling, such as configuration and delivery, of the customized PIN/PUK code is performed during provisioning of the subscriber entity 400.

S201. The user 500 might select the customized PIN/PUK code. This could be achieved by the mobile network operator entity 300 querying the user 500 to select a customized PIN/PUK code. For example, the mobile network operator entity 300 might receive an online form comprising the customized PIN/PUK code from the user 500. The customized PIN/PUK code might be randomly selected by the user 500. Alternatively, the subscriber entity 400 might be pre-installed with random, or otherwise customized, PIN/PUK code, for example configured by the device manufacturer. These customized PIN/PUK code could then be provided in a similar way as the device owner would provide the eUICC identification (EID) during profile ordering.

S202. The mobile network operator entity 300 configures the PIN/PUK code setup for the subscription profile. This information is in step S203 communicated to the subscription management entity 200. If the user 500 provided the customized PIN/PUK code, the mobile network operator entity 300 includes that information. for example, based on profileType. Otherwise, the mobile network operator entity 300 might itself generate the customized PIN/PUK and include the thus generated customized PIN/PUK code or an indication that the subscription management entity 200 should generate the customized PIN/PUK code. The mobile network operator entity 300 or the subscription management entity 200 might thus select/generate the customized PIN/PUK code on behalf of the user 500. Finally, there is an indication on how the customized PIN/PUK code should be provided to the user 500, that is, whether the mobile network operator entity 300 is to provide the customized PIN/PUK code or the subscription management entity 200 is to provide the customized PIN/PUK code e.g. as part of profile metadata. Some of the indications could be implicit.

S203. The information selected by the user 500 or the mobile network operator entity 300 is transferred to the subscription management entity 200 by the mobile network operator entity 300 using an extension of the ES2+.DownloadOrder API call. Alternatively, the customized PIN/PUK code could be optional own fields similar to the integrated circuit card identifier (ICCID) and Profile Type in ES2+.DownloadOrder API call. Below is provided an example request for ES2+.DownloadOrder with an extension. In the following example, the extension "customerExtension" carries additional configuration data related to the PIN/PUK code from the mobile network operator entity 300 to the subscription manager entity 200. The extension is generated by the mobile network operator entity 300 in step S202. The extension comprises parameters denoted PINPUKRequest to select which entity to generate the PIN/PUK code and the PIN/PUK code itself if already defined by the mobile network operator entity 300. It also comprises parameters denoted PINPUKDelivery that define preference of the mobile network operator entity 300 regarding distribution of the PIN/PUK code from the subscription management entity 200 to the user 500.

```
{
    "type" : "object",
    "properties" : {
        "eid" : {
            "type" : "string",
            "pattern" : "^[ 0-9]{32}$",
            "description" : "EID as desc in SGP.02"
        },
        "iccid" : {
            "type" : "string",
            "pattern" : "^[0-9]{19,20}$",
            "description" : "ICCID as desc in ITU-T E.118"
        },
        "profileType" : {
            "type" : "string",
            "description" : "content free information defined by the Operator"
        }
        "customerExtension" : {
            "type" : "object",
            "properties" : {
                "PINPUKDelivery" : {
                    "type" : "object",
                    "properties": {
                        "deliveryMethod": {
                            "type": "string",
                            "description" : "Delivery method of PIN/PUK code defined by MNO to the subscription manager"
                        }
                    }
                }
                "PINPUKRequest": {
                    "type" : "object",
                    "properties": {
                        "generationTrigger": {
                            "type": "string",
                            "description": "Explicit trigger to subscription manager for PIN/PUK generation"
                        },
                        "pin" : {
                            "type" : "string",
                            "pattern" : "^[0-9]{8}$",
                            "description" : " SIM Profile PIN Code. Length = 8 octet string"
                        },
                        "puk" : {
                            "type" : "string",
                            "pattern" : "^[0-9]{8}$",
                            "description" : "SIM profile PUK Code. Length = 8 octet string"
                        }
                    }
                }
            }
        }
```

```
    }
    "required" : ["eid", "iccid", "profileType"]
}
```

S204. Based on the PIN/PUK setup information the subscription management entity 200 either uses the provided customized PIN/PUK code or by itself generates a customized PIN/PUK code. The PIN/PUK setup information also impacts how the subscription management entity 200 replies to the request in step S205; either just acknowledging the request to configure the customized PIN/PUK code (in all cases) or also including the customized PIN/PUK code configured to the subscription profile (always optional, except if the subscription management entity 200 was requested to generate the customized PIN/PUK code but not to distribute the customized PIN/PUK code over ES9+, where it is mandatory).

S205. The subscription management entity 200 provides the customized PIN/PUK code as PIN/PUK setup information as an extension using an ES2+.DownloadOrder response at least when the customized PIN/PUK code was generated by the subscription management entity 200. For other cases, there is no explicit need for the subscription management entity 200 to send the information in the ES2+.DownloadOrder response, but it can be included as an acknowledgement of the values configured into the subscription profile. This might harmonize the response handling at the mobile network operator entity 300 side for all alternatives. Further, the PIN/PUK setup information provided by the subscription management entity 200 might comprise one or more flags for if and when the mobile network operator entity 300 is to deliver the customized PIN/PUK code the user 500.

S206. The mobile network operator entity 300 might select to provide the customized PIN/PUK code to the user 500 when the activation code (AC) is provided, either by providing the customized PIN/PUK code to a user interface of the user 500, or sending the customized PIN/PUK code to the user 500 e.g. using e-mail or regular mail. This might be the case when a delivery flag indicates to send the customized PIN/PUK code together with the AC to the user 500. The customized PIN/PUK code, if sent by e-/mail, might be sent later on, e.g. triggered after the subscription profile has been successfully downloaded.

S207. The subscriber entity 400 downloads the subscription profile from the subscription management entity 200. The subscription management entity 200 might deliver the customized PIN/PUK code to the subscriber entity 400 via ES9+, which will be described below with reference to the signalling diagram of FIG. 4.

S208. After successful download and installation of the subscription profile (e.g. as defined in SGP.22v2.1, Section 3.1.3) or failure thereof, the subscription management entity 200 informs the mobile network operator entity 300 regarding the success or failure of the profile download and installation process.

S209. When the subscription profile has been successfully downloaded, the mobile network operator entity 300 optionally stores at least the customized PUK code in its subscriber database, for example depending preference information of the subscriber entity 400. Alternatively, the mobile network operator entity 300 might store at least the customized PUK code in its subscriber database already after step S205. For example, there could be an option during contract negotiation phase between the subscriber entity 400 and the mobile network operator entity 300 whether the customized PUK code is to be stored in the subscriber database for future reference. If such agreement is provided by the subscriber entity 400, the mobile network operator entity 300 might store the customized PUK code for future retrieval.

S210. When the PIN/PUK setup information indicates the mobile network operator entity 300 to provide the customized PIN/PUK code to the user 500 after successful profile download, the mobile network operator entity 300 sends the customized PIN/PUK code to the user 500.

Figure 4:
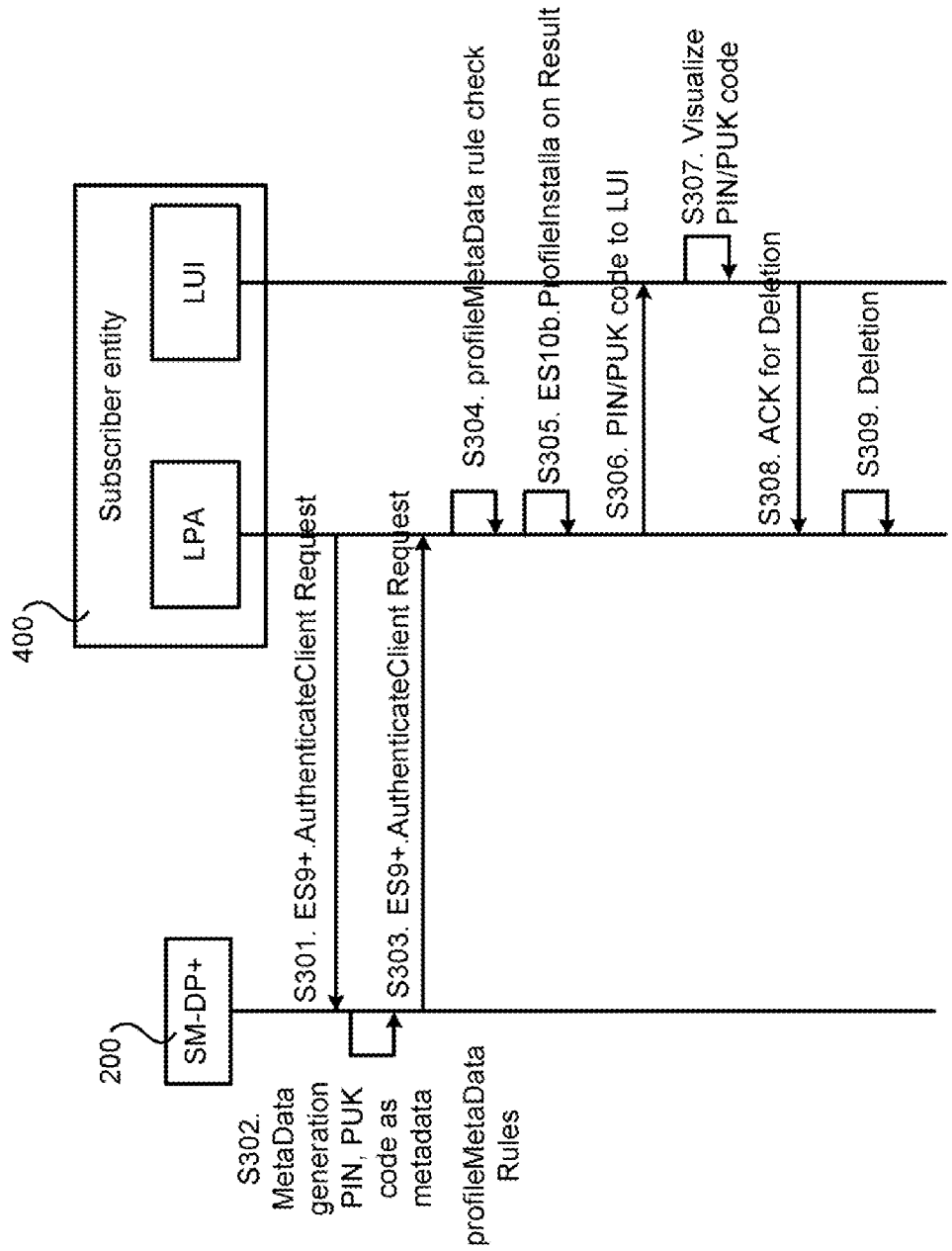

FIG. 4 is a signalling diagram of an embodiment for delivering the customized PIN/PUK code as a metadata during profile download using ES9+.

In general terms, ES9+ is used by the local profile assistant (LPA) of the subscriber entity 400 to download the subscription profile to the subscriber entity 400 from the subscription management entity 200. As will be disclosed hereinafter, the customized PIN/PUK code might be provided to the subscriber entity 400 via the ES9+ interface.

S301. The LPA of the subscriber entity 400 sends an ES9+.AuthenticateClient Request (e.g. as defined in SGP.22v2.1, Section 3.1.2) to authenticate the subscriber entity 400 to the subscription management entity 200.

S302. When the verification of the ES9+.Authentication-Client Request (as defined in SGP.22v2.1 section 3.1.3) is successful, the subscription management entity 200 generates profile metadata for the subscription profile and sends the profile metadata to the LPA over a protected channel. The default profile metadata object is shown below:

```
StoreMetadataRequest ::= [37] SEQUENCE { -- Tag 'BF25'
    iccid Iccid,
    serviceProviderName [17] UTF8String (SIZE (0..32)), --
Tag '91'
    profileName [18] UTF8String (SIZE (0..64)), -- Tag '92'
(corresponds to 'Short Description' defined in SGP.21
[2])
    iconType [19] IconType OPTIONAL, -- Tag '93' (JPG or
PNG)
    icon [20] OCTET STRING (SIZE ( 0..1024)) OPTIONAL, -- Tag
'94'(Data of the icon. Size 64 x 64 pixel. This field
SHALL only be present if iconType is present)
    profileclass [21] ProfileClass DEFAULT operational, --
Tag '95'
    notificationConfigurationInfo [22] SEQUENCE OF
        NotificationConfigurationInformation OPTIONAL,
    profileOwner [23] OperatorId OPTIONAL, -- Tag 'B7'
    profilePolicyRules [25] PprIds OPTIONAL -- Tag '99'
}
```

Two new fields, pinCode and pukCode, might be added for the profile metadata object as follows:

```
{
    pinCode  OPTIONAL,
    pukCode OPTIONAL
}
```

As the profile metadata is sent over a protected channel, the customized PIN/PUK code will be protected end-to-end. Further, there might be defined profile policy rules defining how to handle the customized PIN/PUK code in the LPA. The profile policy rules might define that the customized PIN/PUK code should only be sent to the local user interface (LUI) of the subscriber entity 400 after a successful profile installation. The customized PIN/PUK code might be conditioned such that after successful display at the LUI and acknowledgment (by the user 500), the customized PIN/PUK code should be erased from the LPA.

S303. The subscription management entity 200 returns the profile metadata along with the customized PIN/PUK code (as mentioned in step S302) and other object to the LPA.

S304. On reception of the profile metadata, the LPA checks whether the profile metadata comprises a PIN/PUK code field. If the profile metadata comprises a PIN/PUK code field, the LPA temporarily and locally stores the customized PIN/PUK code and proceed to perform the profile download and installation operation. Profile policy rules as mentioned above might be used to handle the customized PIN/PUK code in the LPA.

S305. When the profile download and installation completes (e.g., based on information using a so-called ES10b.ProfileInstallation result), if there is any error, the LPA erases the locally stored customized PIN/PUK code.

S306 and S307. If the profile installation is successful, the customized PIN/PUK code is provided to the LUI for display.

S307 and S308. The customized PIN/PUK code is erased from the LPA in response to user acknowledgement of having noted the customized PIN/PUK code (and thus for the customized PIN/PUK code to be deleted from the LPA).

In summary, there has been provided mechanisms for handling a subscription profile for a subscriber entity 400. These mechanisms enable configuration and distribution of customized PIN/PUK codes required for a subscription profile. There has been provided mechanisms for flexible and configurable way to generate the customized PIN/PUK code and how to distribute it. The customized PIN/PUK code might be generated either by the user 500, the mobile network operator entity 300, or the subscription management entity 200. The customized PIN/PUK code might either be delivered to the subscriber entity 400 inside/together with the AC, or be provided with profile metadata from which the subscriber entity 400 might render the customized PIN/PUK code, or be provided to the subscriber entity 400 only after successful profile download (e.g. over e-mail). For example, ES9+ messages and LPA functionality might be modified to support the delivery of the customized PIN/PUK code to the subscriber entity 400.

Figure 5:
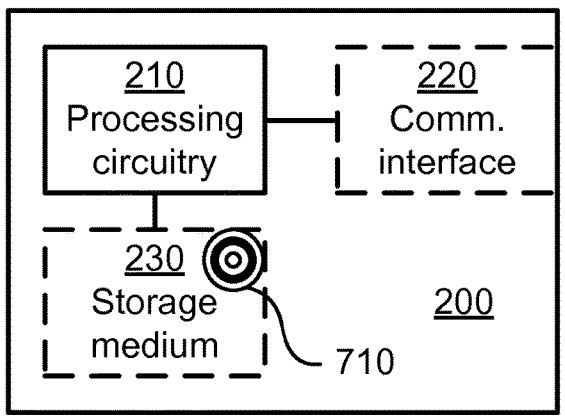
FIG. 5 is a schematic diagram showing functional units of a subscription management entity according to an embodiment.

FIG. 5 schematically illustrates, in terms of a number of functional units, the components of a subscription management entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscription management entity 200 to perform a set of operations, or steps, S102-S110, as disclosed above. For example, the storage medium 230 may store the set of operations, and the processing circuitry 210 may be configured to retrieve the set of operations from the storage medium 230 to cause the subscription management entity 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The subscription management entity 200 may further comprise a communications interface 220 at least configured for communications with other entities, functions, and devices of the communications system 100. As such the communications interface 220 may comprise one or more transmitters and receivers, comprising analogue and digital components. The processing circuitry 210 controls the general operation of the subscription management entity 200 e.g. by sending data and control signals to the communications interface 220 and the storage medium 230, by receiving data and reports from the communications interface 220, and by retrieving data and instructions from the storage medium 230. Other components, as well as the related functionality, of the subscription management entity 200 are omitted in order not to obscure the concepts presented herein.

Figure 6:
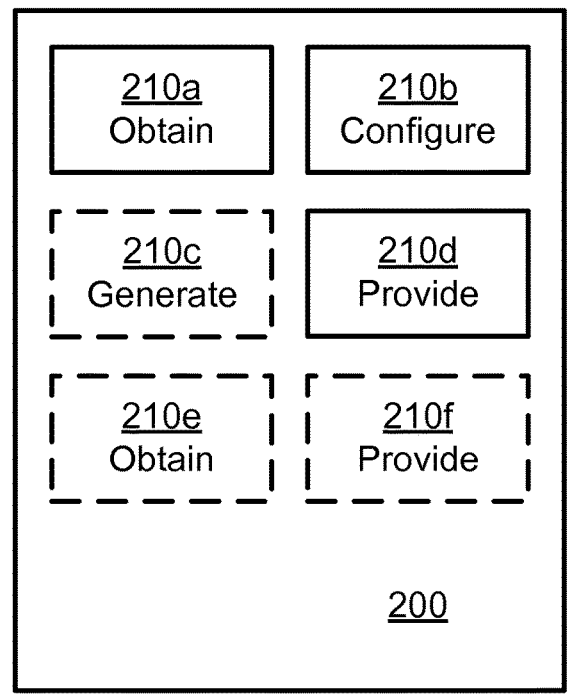
FIG. 6 is a schematic diagram showing functional modules of a subscription management entity according to an embodiment.

FIG. 6 schematically illustrates, in terms of a number of functional modules, the components of a subscription management entity 200 according to an embodiment. The subscription management entity 200 of FIG. 6 comprises a number of functional modules; an obtain module 210a configured to perform step S102, a configure module 210b configured to perform step S104, and a provide module 210d configured to perform step S106. The subscription management entity 200 of FIG. 6 may further comprise a number of optional functional modules, such as any of a generate module 210c configured to perform step S104a, an obtain module 210e configured to perform step S108, and a provide module 210f configured to perform step S110. In general terms, each functional module 210a-210f may in one embodiment be implemented only in hardware and in another embodiment with the help of software, i.e., the latter embodiment having computer program instructions stored on the storage medium 230 which when run on the processing circuitry makes the subscription management entity 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The subscription management entity 200 may be provided as a standalone device or as a part of at least one further device. For example, the subscription management entity 200 may be an integrated part of, or collocated with, an SM-DP+. Alternatively, functionality of the subscription management entity 200 may be distributed between at least two devices, or nodes. Thus, a first portion of the instructions performed by the subscription management entity 200 may be executed in a first device, and a second portion of the of the instructions performed by the subscription management entity 200 may be executed in a second device; the herein disclosed embodiments are not limited to any particular number of devices on which the instructions performed by the subscription management entity 200 may be executed. Hence, the methods according to the herein disclosed embodiments are suitable to be performed by a subscription management entity 200 residing in a cloud computational environment. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 720 of FIG. 7 (see below).

Figure 7:
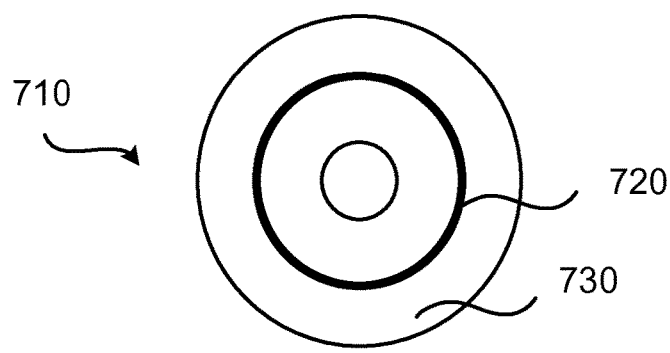
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling a subscription profile for a subscriber entity, the method being performed by a subscription management entity, the method comprising:
    the subscription management entity, which is separate from the subscriber entity, obtaining a request transmitted by a mobile network operator (MNO) entity to configure the subscription profile for the subscriber entity, wherein the request transmitted by the MNO entity to configure the subscription profile for the subscriber entity comprises a customized code comprising a customized personal identification number (PIN) and/or a customized personal unlocking key (PUK) and indicates how to distribute the customized code to the subscriber entity;
    configuring the subscription profile with the customized PIN and/or the customized PUK (customized PIN/PUK) for the subscriber entity; and
    after configuring the subscription profile, providing to the MNO entity an indication of the PIN/PUK being configured in the subscription profile, wherein
    the indication indicated by the request transmitted by the MNO entity is defined by absence of indication that the customized code is to be distributed to the subscriber entity from the subscription management entity.

2. The method according to claim 1, wherein the request transmitted by the MNO entity is received in an ES2+. DownloadOrder API call message.

3. The method according to claim 1, wherein the response is provided in an ES2+.DownloadOrder response message.

4. The method according to claim 1, wherein the customized PIN is different from "0000" and "1234".

5. The method according to claim 1, wherein the subscription management entity is an enhanced Subscription Manager Data Preparation (SM-DP+) entity.

6. A method for handling a subscription profile for a subscriber entity, the method being performed by a subscription management entity, the method comprising:
the subscription management entity, which is separate from the subscriber entity, obtaining a request transmitted by a mobile network operator (MNO) entity to configure the subscription profile for the subscriber entity, wherein the request transmitted by the MNO entity to configure the subscription profile for the subscriber entity comprises a customized code comprising a customized personal identification number (PIN) and/or a customized personal unlocking key (PUK), wherein the request transmitted by the MNO entity further comprises an indication that the subscription profile is to be configured with the customized code and indicates how to distribute the customized code to the subscriber entity;
configuring the subscription profile with the customized PIN and/or the customized PUK (customized PIN/PUK) for the subscriber entity; and
after configuring the subscription profile, providing to the MNO entity an indication of the PIN/PUK being configured in the subscription profile, wherein
the indication indicated by the request transmitted by the MNO entity is defined by absence of indication that the customized code is to be distributed to the subscriber entity from the subscription management entity.

7. The method according to claim 6, wherein the indication is the customized code itself.

8. The method according to claim 6, wherein the request transmitted by the MNO entity further comprises one of:
information indicating that the subscription management entity is to provide the PIN/PUK to the subscriber entity, or
information indicating that the MNO entity is to provide the customized PIN/PUK to the subscriber entity.

9. A method for handling a subscription profile for a subscriber entity, the method being performed by a subscription management entity, the method comprising:
the subscription management entity, which is separate from the subscriber entity, obtaining a request transmitted by a mobile network operator (MNO) entity to configure the subscription profile for the subscriber entity, wherein the request transmitted by the MNO entity to configure the subscription profile for the subscriber entity comprises a customized code comprising a customized personal identification number (PIN) and/or a customized personal unlocking key (PUK), wherein the request transmitted by the MNO entity further comprises an indication of how to distribute the customized code to the subscriber entity;
configuring the subscription profile with the customized PIN and/or the customized PUK (customized PIN/PUK) for the subscriber entity; and
after configuring the subscription profile, providing to the MNO entity an indication of the PIN/PUK being configured in the subscription profile, wherein
the indication in the request transmitted by the MNO entity is defined by absence of indication that the customized code is to be distributed to the subscriber entity from the subscription management entity.

10. The method according to claim 9, wherein the indication in the request transmitted by the MNO entity defines the customized code to be distributed to the subscriber entity not from the subscription management entity.

11. The method according to claim 9, wherein the indication defines the customized code to be distributed to the subscriber entity from the subscription management entity during download of the subscription profile.

12. The method according to claim 11, the method further comprising:
obtaining a request for download of the subscription profile from the subscriber entity; and
providing the customized code to the subscriber entity during the download of the subscription profile to the subscriber entity.

13. The method according to claim 12, wherein the customized code is provided to the subscriber entity as profile metadata during the profile download.

14. The method according to claim 12, wherein the customized code is provided to the subscriber entity in an ES9+.AuthenticateClient Response message.

15. A subscription management entity for handling a subscription profile for a subscriber entity, the subscription management entity comprising:
processing circuitry; and
a storage medium storing instructions that, when executed by the processing circuitry, cause the subscription management entity to:
obtain a request transmitted by a mobile network operator (MNO) entity to configure the subscription profile for the subscriber entity, wherein the request transmitted by the MNO entity to configure the subscription profile for the subscriber entity comprises a customized code and indicates how to distribute the customized code to the subscriber entity;
configure the subscription profile with the customized code for the subscriber entity; and
provide to the MNO entity an indication of the customized code being configured in the subscription profile, wherein
the customized code comprises a customized personal identification number (PIN) and/or a customized personal unlocking key (PUK), and
the indication indicated by the request transmitted by the MNO entity is defined by absence of indication that the customized code is to be distributed to the subscriber entity from the subscription management entity.

16. A computer program product comprising a non-transitory computer readable storage medium storing a computer program for handling a subscription profile for a subscriber entity, the computer program comprising computer code which, when run on processing circuitry of a subscription management entity, causes the subscription management entity to:
obtain a request transmitted by a mobile network operator (MNO) entity to configure the subscription profile for the subscriber entity, wherein the request transmitted by the MNO entity to configure the subscription profile for the subscriber entity comprises a customized code and indicates how to distribute the customized code to the subscriber entity;
configure the subscription profile with the customized code for the subscriber entity; and provide to the MNO entity an indication of the customized code being configured in the subscription profile, wherein the customized code comprises a customized personal identification number (PIN) and/or a customized personal unlocking key (PUK), and the indication indicated by the request transmitted by the MNO entity is defined by absence of indication that the customized code is to be distributed to the subscriber entity from the subscription management entity.

17. A method for handling a subscription profile for a subscriber entity, the method being performed by a subscription management entity, the method comprising:

the subscription management entity obtaining a request to configure the subscription profile for the subscriber entity, wherein the request to configure the subscription profile for the subscriber entity was transmitted by a mobile network operator (MNO) entity and the request transmitted by the MNO entity to configure the subscription profile for the subscriber entity comprises a customized code comprising a personal identification number (PIN) selected by the subscriber entity and/or a personal unlocking key (PUK) selected by the subscriber entity, wherein the request transmitted by the MNO entity further comprises an indication of how to distribute the customized code to the subscriber entity;

in response to obtaining the request transmitted by the MNO to configure the subscription profile for the subscriber entity, configuring the subscription profile with the PIN and/or the PUK (PIN/PUK) selected by the subscriber entity; and after configuring the subscription profile, providing to the MNO entity an indication of the PIN/PUK being configured in the subscription profile, and the indication indicated by the request transmitted by the MNO entity is defined by absence of indication that the customized code is to be distributed to the subscriber entity from the subscription management entity.

18. A subscription management entity for handling a subscription profile for a subscriber entity, the subscription management entity comprising: processing circuitry; and a storage medium storing instructions that, when executed by the processing circuitry, cause the subscription management entity to perform the method of claim 17.

19. A computer program product comprising a non-transitory computer readable storage medium storing a computer program for handling a subscription profile for a subscriber entity, the computer program comprising computer code which, when run on processing circuitry of a subscription management entity, causes the subscription management entity to perform the method of claim 17.

* * * * *